（12) United States Patent
Naruse et al.

(10) Patent No.: US 7,558,963 B2
(45) Date of Patent: Jul. 7, 2009

(54) COMMUNICATION DEVICE AND PROGRAM

(75) Inventors: Naoki Naruse, Yokohama (JP); Yuichi Ichikawa, Yokosuka (JP); Tatsuro Oi, Kawasaki (JP); Nobuyuki Watanabe, Sayama (JP); Yasunori Hattori, Fujisawa (JP); Masato Takeshita, Mitaka (JP); Masakazu Nishida, Yokosuka (JP); Mao Asai, Yokosuka (JP); Masayuki Tsuda, Tokyo (JP); Atsuki Tomioka, Yokohama (JP); Kazuhiro Yamada, Yokohama (JP); Satoshi Washio, Tokyo (JP); Dai Kamiya, Tokyo (JP); Naoki Yamane, Tokyo (JP); Keiichi Murakami, Ichikawa (JP)

(73) Assignee: NTT DoCoMo, Inc., Tokyo (JP)

( * ) Notice: Subject to any disclaimer, the term of this patent is extended or adjusted under 35 U.S.C. 154(b) by 826 days.

(21) Appl. No.: 10/814,662

(22) Filed: Mar. 31, 2004

(65) Prior Publication Data
US 2005/0005099 A1  Jan. 6, 2005

(30) Foreign Application Priority Data
Mar. 31, 2003  (JP) ............................. 2003-096088

(51) Int. Cl.
H04L 9/32 (2006.01)
(52) U.S. Cl. ..................... 713/179; 713/176; 713/190
(58) Field of Classification Search .................. 713/176, 713/179, 190
See application file for complete search history.

(56) References Cited
U.S. PATENT DOCUMENTS
5,673,315 A  9/1997  Wolf
(Continued)

FOREIGN PATENT DOCUMENTS
EP  0 813 132 A2  12/1997
(Continued)

OTHER PUBLICATIONS
Schneier (Bruce Schneier, "Applied Cryptography, Protocols, Algorithms and Source Code in C", 2nd edition, 1996 ISBN: 0471128457), p. 38.*
(Continued)

Primary Examiner—Kambiz Zand
Assistant Examiner—Peter Poltorak
(74) Attorney, Agent, or Firm—Brinks Hofer Gilson & Lione

(57) ABSTRACT

The present invention provides a means for determining authenticity of a combination of files which are downloaded to a mobile station, and which are related to one another. To achieve the stated object, in a system according to the present invention, mobile station 16, which is capable of running a Java-APP, receives an ADF from CP server device 12. Then mobile station 16 receives a SDF from trusted server device 18, which is identified by data contained in the ADF. Mobile station 16 calculates a hash value of certificate data contained in the ADF, and verifies whether the calculated hash value of the certificate data and a hash value of the certificate data which is contained in the SDF are identical to each other. Next, mobile station 16 receives a JAR file from CP server device 12. Mobile station 16 calculates a hash value of the JAR file, and verifies whether the calculated hash value of the JAR file and a hash value of the JAR file contained in the ADF are identical to each other.

22 Claims, 5 Drawing Sheets

U.S. PATENT DOCUMENTS

| | | | |
|---|---|---|---|
| 5,708,709 A * | 1/1998 | Rose | 705/59 |
| 6,269,421 B1 | 7/2001 | Nishimura | |
| 6,317,742 B1 | 11/2001 | Nagaratnam et al. | |
| 6,345,288 B1 | 2/2002 | Reed et al. | |
| 6,766,353 B1 | 7/2004 | Lin et al. | |
| 6,971,016 B1 | 11/2005 | Barnett | |
| 6,976,165 B1 | 12/2005 | Carpentier et al. | |
| 2002/0073072 A1* | 6/2002 | Fukumoto | 707/1 |
| 2003/0061487 A1* | 3/2003 | Angelo et al. | 713/176 |
| 2005/0160045 A1 | 7/2005 | Watanabe et al. | |
| 2005/0166264 A1 | 7/2005 | Yamada et al. | |

FOREIGN PATENT DOCUMENTS

| | | |
|---|---|---|
| EP | 1 033 652 A2 | 9/2000 |
| EP | 1 132 796 A1 | 9/2001 |
| EP | 1 289 326 A1 | 3/2003 |
| EP | 1 326 396 A2 | 7/2003 |
| JP | H10-083310 | 3/1998 |
| JP | H10-091427 | 4/1998 |
| JP | H11-205767 | 7/1999 |
| JP | 2001-117769 A | 4/2001 |
| JP | 2001-216043 A | 8/2001 |
| JP | 2001-243062 A | 9/2001 |
| JP | 2003-50641 A | 2/2003 |
| WO | WO 98/21683 A2 | 5/1998 |
| WO | WO 00/42498 A1 | 7/2000 |

OTHER PUBLICATIONS

Stallings (William Stallings, "Cryptography and network security", 2th edition, 1998, ISBN: 0138690170) in view of Angelo (USPUB 2003/0061487), p. 243-254.*

Feghhi (Jalal Feghhi, Jalil Feghhi, Peter Williams, Digital Certificates Applied Internet Security, 1999, ISBN: 0201309807), p. 61-89.*

Japanese Office Action mailed Mar. 13, 2007.

Edited by ASCII Shoseki Henshubu "i-Mode Java Programming—Stand Alone Application Part revised new edition" ASCII Coup., May 21, 2001, total 17 pages (with partial translation).

Li, G. "Java Series Java2 Platform Security", *Kabushiki Kaisha Pearson Education*, First Edition, Nov. 30, 2000, total 14 pages (with partial translation).

Computer Today, No. 87, Sep. 1, 1998, total 9 pages (with partial translation).

Translation of International Preliminary Examination Report issued Oct. 6, 2003 in International Application No. PCT/JP03/03974.

Megler, V., "i-mode From bandwidth problem into Internet phenomenon", *Developerworks*, Feb. 2002, XP002329582, 13 pages.

Sun Microsystems, Inc., "Default Policy Implementation and Policy File Syntax", *Java Sun*, Oct. 30, 1998, XP002329583, 11 pages.

NTT DoCoMo, "i-mode Java Content Developer's Guide—Functional Descriptions-", Release 1.1, May 14, 2000 total 12 pages.

Jess Garms, "Professional Java Security", Publishing House of Electronics Industry, Jan. 31, 2002 (with translation) total 35 pages.

Li Gong, "Java2 Platform Security", Japan, Pearson Education, Inc., Nov. 30, 2000, $1^{st}$ edition, pp. 41-44 and 123-138 (ISBN: 4-89471-193-1) (with conscious explanation).

ASCII Book Editorial Department, "i mode Java programming—Standalone Applications: Newly-Revised Edition", Japan ASCII Coporation, May 21, 2001, $1^{st}$ Edition, pp. 19, 20 and 40-52 (ISBN: 4-7561-3790-3) (with conscious explanation).

Kaku, T. et al., "Introduction to Java Programming in i-mode, $1^{st}$ Edition" *Nikkei Business Publications, Inc.*, Mar. 26, 2001, pp. 37-41 (with partial translation).

"i Appli Service & 503i Series" *Business Communication*, vol. 38, No. 2, Feb. 1, 2001, pp. 44-47 (with partial translation).

Jaworski, J., "Java 2 Security Programming" Java Security Handbook, $1^{st}$ Edition, Apr. 25, 2001, pp. 79-90, 529-541 (with partial translation).

Kawaguchi, "Practically Useful Homepages vol. 30", Nikkei PC21, Nikkei Business Publication, Inc., Jun. 1, 2000, vol. 5, No. 11 pp. 150-154 (with partial translation).

Chinese Office Action dated May 12, 2006 in Chinese patent application No. 03807636.5 (with translation).

Chinese Office Action dated Dec. 1, 2006 in Chinese patent application No. 03807636.5 (with translation).

Japanese Office Action issued Aug. 28, 2007 in Japanese Patent Application No. 2002-001843 (with translation).

Japanese Office Action issued Oct. 16, 2007 in Japanese Patent Application No. 2003-581004 (with translation).

Japanese Office Action issued Jul. 22, 2008 in Japanese Patent Application No. 2002-001843 (with translation).

Supplementary European Search Report issued Nov. 12, 2008 in European Application No. 03715596.7, 5 pages.

* cited by examiner

COMMUNICATION DEVICE AND PROGRAM

This application claims priority under 35 U.S.C. § 119 to Japanese Patent Application No. 2003-096088 filed Mar. 31, 2003, the entire content of which is hereby incorporated by reference.

TECHNICAL FIELD

The present invention relates to a technology for determining authenticity of downloaded data.

BACKGROUND ART

Commonly, software is downloaded to communication devices through communication networks such as the Internet, and is used in those communication devices. However, such downloading and use of software raises a risk of data hacking attacks, which can result in unauthorized accesses to data. If unauthorized access is obtained, malicious software can be downloaded to the communication device.

To counter this problem, a variety of technologies for determining authenticity of downloaded software have been developed. For example, a method has been proposed where prior to downloading software, a user is supplied with an Integrated Circuit card (referred to as 'IC' card hereinafter) by a provider of the software, the IC card containing a hash value, which enables a user to authenticate the software. (For example, refer to Japanese patent laid-open No. 11-205767). By this method, when a user instructs a communication device to download software after the IC card has been loaded in the communication device, the communication device downloads the software and calculates a hash value of the software using a hash function. Then, the communication device compares the calculated hash value and the hash value stored in the IC card so as to determine whether the values match, and therefore whether the received software is authorized for download to the device.

Relevant to the method described above is the popularity of mobile stations which are able to download Java (registered trademark) application software (referred to as 'Java-AP software' hereinafter), and to execute an application program contained in the downloaded Java-AP software (the application program will be referred to as 'Java-APP' hereinafter).

When Java-AP software is downloaded to such a mobile station, first an Application Descriptor File (referred to as an 'ADF' hereinafter) is downloaded from a server device contained in the World Wide Web (referred to as 'WWW' hereinafter) to the mobile station, and then a Java Archive file (referred to as a 'JAR file' hereinafter), which contains a Java-APP, is downloaded to the mobile station.

It is to be noted that in this specification the term 'Java-AP software' refers to a combination of an ADF and a JAR file. One problem affecting files comprising Java-AP software for download to a mobile station, is that they may be subject to a malicious attack. Accordingly, it is necessary to confirm, in advance, authenticity of software to be downloaded.

An ADF is a file containing information data about a corresponding JAR file. Such information includes, for example, a date when the JAR file was updated. Thus, to maintain parity, when the JAR file is updated the corresponding ADF must also be updated. In this way, by confirming proper correspondence of relevant JAR file and ADF, it is possible to confirm authenticity of Java-AP software.

One method that has been proposed with this aim in view is as follows. First, an ADF and a JAR file having a valid correspondence are integrated in a single file. Then a hash value of the integrated file is calculated. The hash value is used to determine whether a downloaded ADF and a JAR file have a valid correspondence. A method similar to this is proposed in the above-mentioned patent document (Japanese patent laid-open No. 11-205767).

A Java-APP contained in a JAR file will commonly be subject to a variety of modifications which are implemented by a provider to fix bugs in or upgrade the program. However, each time the Java-APP is modified, the hash value of the Java-AP software will change. As a result, it becomes necessary for the provider of the Java-APP, namely a Contents Provider (referred to as 'CP' hereinafter), to distribute IC cards containing a new hash value to mobile stations in which the Java-APP has been modified or upgraded. Provision and distribution of such cards upon each modification and upgrade of a program would, however, obviously result in unacceptable costs and logistical problems, and is therefore unrealistic.

In view of this situation, the present invention is aimed at providing a means for confirming authenticity and valid correspondence of multiple files.

DISCLOSURE OF THE INVENTION

To solve the problem described above, the present invention provides a communication device comprising: a receiving means for receiving (a) a first file which contains data indicating a certain value which is calculated on the basis of data of a certain type contained in another file, and (b) a second file which contains data of the certain type; a calculating means for calculating a value which is obtained for assigning the data of the certain type contained in the second file to a one-way function; a comparing means for comparing the value which is calculated by the calculating means and the certain value indicated by the data contained in the first file; and a determining means for determining validity of correspondence of the first file and the second file according to a result of the comparison made by the comparing means.

The present invention further provides a program for instructing a computer to execute: a receiving step for receiving, (a) a first file which contains data indicating a certain value which is calculated on the basis of data of a certain type contained in another file, and (b) a second file which contains data of the certain type; a calculating step for calculating a value which is obtained for assigning the data of the certain type contained in the second file to a one-way function; a comparing step for comparing the value which is calculated in the calculating step and the certain value indicated by the data contained in the first file; and a determining step for determining validity of correspondence of the first file and the second file according to a result of the comparison made in the comparing step.

According to the present invention, data of a certain type contained in the second file received by the receiving means is assigned to a one-way function, and a value obtained from the one-way function is compared to a value indicated by data contained in the first file, which is also received by the receiving means. Then, authenticity of a combination of the first file and the second file is determined on the basis of a result of the comparison. Thus, according to the present invention, validity of correspondence of plural files which relate to one another, such as a series of files comprising software, can be confirmed.

PREFERRED EMBODIMENTS FOR CARRYING OUT THE INVENTION

Figure 1:
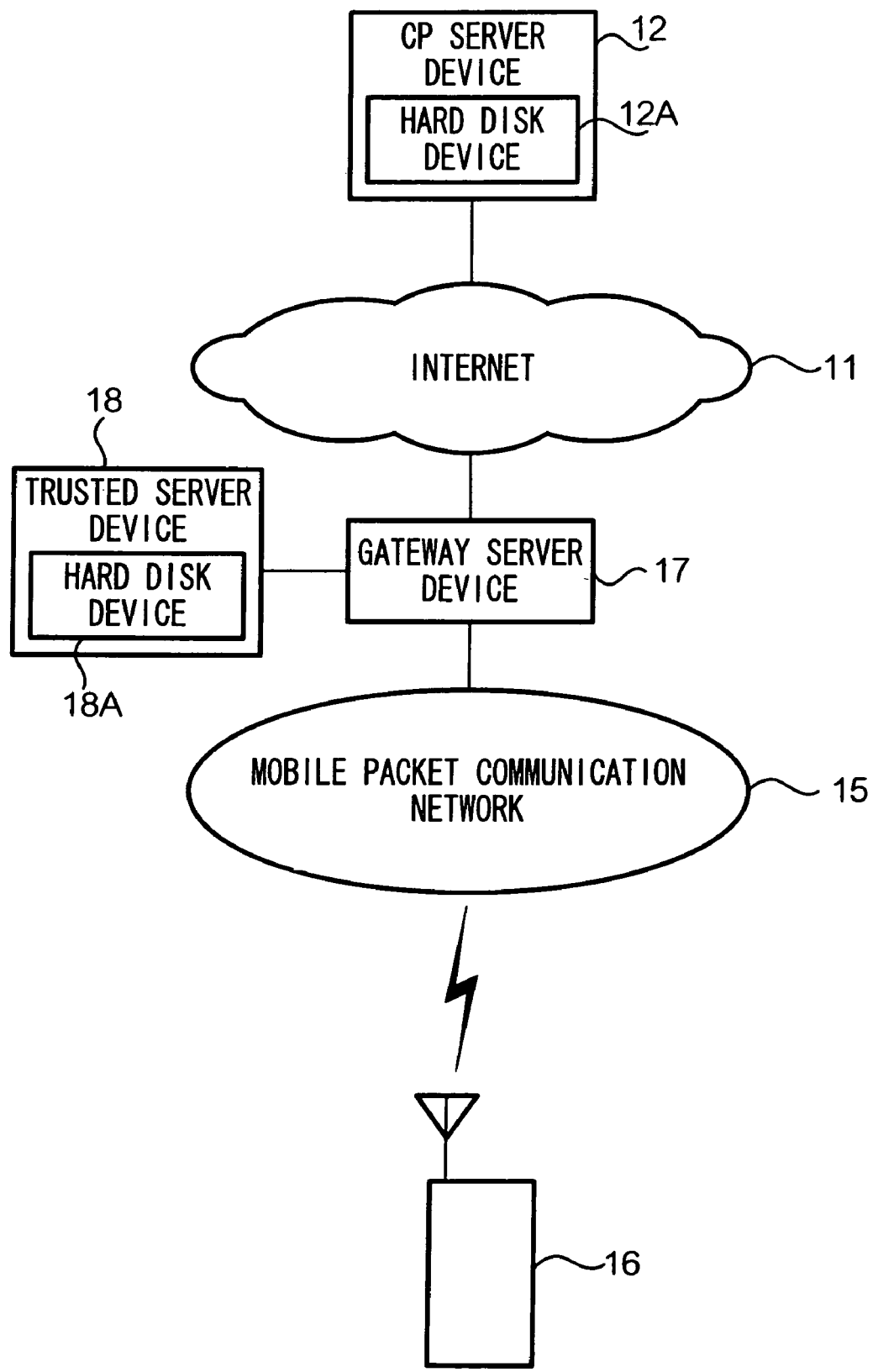
FIG. 1 is a block diagram illustrating configurations of a delivery system according to an embodiment of the present invention.

In the following description, a delivery system, which is realized by implementing an embodiment of the present invention, will be explained with reference to the drawings. In the drawings, like elements are denoted by like reference numerals.

According to the delivery system, a user of a mobile station is able to (safely) instruct the mobile station to download desired Java-AP software, install a Java-APP contained in the downloaded Java-AP software, and run the Java-APP.

Java-AP software is downloaded to a mobile station in the delivery system as follows. First, the mobile station displays an introductory explanation of the Java-AP software for the user. When the user instructs the mobile station to download the Java-AP software, the mobile station first receives an ADF of the Java-AP software. Then the mobile station receives a file called a Security Description File (referred to as a 'SDF' hereinafter) corresponding to the Java-AP software. Lastly, the mobile station receives a JAR file of the Java-AP software. SDF files contain data indicating behavior restrictions applicable to corresponding Java-APPs existing in a mobile station. Thus, when a mobile station runs a Java-APP, the mobile station controls, on the basis of conditions indicated in a corresponding SDF, behavior of an application provided by the Java-APP.

In this specification, the term 'application' means a group of functions which are provided by a CPU when the CPU runs a program. In the following explanation, to describe a situation where a CPU runs a Java-APP to provide a group of functions, namely a Java-AP, the expression 'a Java-AP is realized' will be used. An application which is realized by a Java-APP is called a 'Java-AP' hereinafter.

A SDF is prepared by the above-mentioned carrier upon completion of a contract made between the carrier and a CP who provides the Java-AP software. In the delivery system in the present embodiment, some Java-APPs have corresponding SDFs, but other Java-APPs do not have corresponding SDFs. Behavior of a Java-AP realized by a Java-APP which has a corresponding SDF is restricted on the basis of the SDF. Such Java-AP and Java-APP are called 'trusted Java-AP' and 'trusted Java-APP' in this specification, since reliability is guaranteed by the carrier according to a contract made between the carrier and a CP which provides the Java-APP.

In the following explanation of the present embodiment, 'Java-AP software' can mean a combination of an ADF, a SDF and a JAR file when the Java-APP contained in the JAR file is a trusted Java-APP, or can mean a combination of an ADF and a JAR file when the Java-APP contained in the JAR file is not a trusted Java-APP. In this specification, a Java-APP which is not a trusted Java-APP is called an 'untrusted Java-APP', and an application which is realized by an untrusted Java-APP is called an 'untrusted Java-AP'. In the same way, in this specification, Java-AP software which contains a trusted Java-APP is called 'trusted Java-AP software', and a Java-AP which contains an untrusted Java-APP is called 'untrusted Java-AP software'.

(1: Configuration)

As shown in FIG. 1, the delivery system comprises: CP server device 12 connected to Internet 11; mobile packet communication network 15 through which the carrier provides mobile packet communication services to mobile stations; mobile station 16 which exchanges data packets with other communication devices through mobile packet communication network 15; gateway server device 17 which interconnects Internet 11 and mobile packet communication network 15; and trusted server device 18 which is connected to gateway server device 17. Although in practice, the delivery system may comprise plural mobile stations, for the sake of simplicity only one mobile station 16 is shown in FIG. 1. Accordingly, only one CP server device 12 is shown in FIG. 1.

In the following, details of each component of the delivery system are explained.

(1-1: CP Server Device)

CP server device 12 has hardware components and features of a general WWW server device. CP server device 12 comprises hard disk device 12A. CP server device 12 is able to establish a connection following Transmission Control Protocol (referred to as 'TCP' hereinafter), between CP server device 12 and a communication device. When CP server device 12 receives a request message following a GET method of Hypertext Transfer Protocol (referred to as 'HTTP' hereinafter) using the TCP connection, CP server device 12 reads out a file identified by a Uniform Resource Locator (referred to as a 'URL' hereinafter) which is assigned to the GET method from hard disk device 12A, transmits a response message of HTTP containing the file to the communication device, and disconnect the TCP connection.

Hard disk device 12A stores JAR files containing programs written in Java programming language, and ADFs containing data indicating information on their corresponding JAR files.

Figure 2:
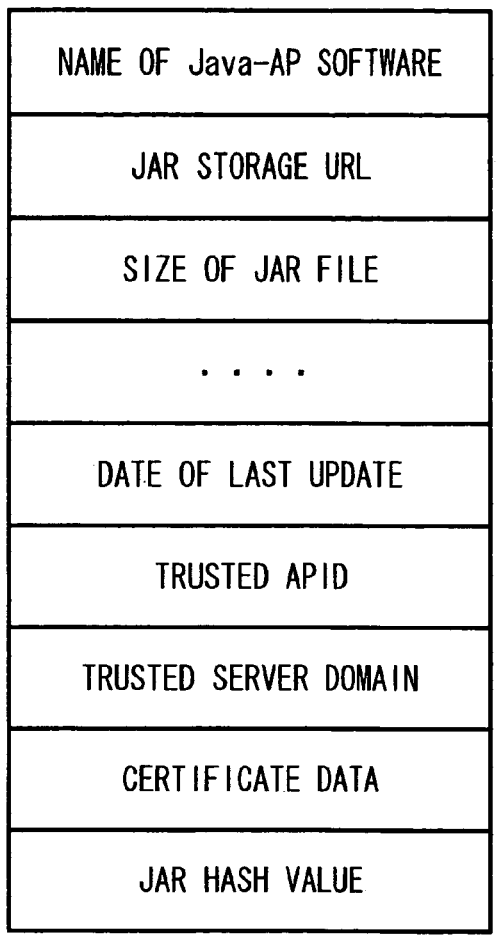
FIG. 2 is a conceptual drawing illustrating a typical data structure of an ADF used in the system.

ADFs stored in CP server device 12 are categorized into ADFs which correspond to trusted Java-APPs, and ADFs which correspond to untrusted Java-APPs. Both types of ADFs contain data which are contained in a normal ADF in the prior art, such as data indicating a name of Java-AP software, a JAR storage URL which is data indicating a storage location of a JAR file in WWW, data indicating a size of the JAR file, data indicating a date of the last update of the JAR file, and so on. Each of the ADFs which correspond to trusted Java-AP software contains, as shown in FIG. 2: trusted APID which is an identifier assigned to each trusted Java-AP software; data indicating a trusted server domain which specifies a storage location of a corresponding SDF in WWW, certificate data which is provided from a Certificate Authority (referred to as a 'CA' hereinafter) to a CP who operates CP server device 12; and a JAR hash value which indicates a hash value of a corresponding JAR file, in addition to the above-mentioned data.

A hash value is a value of a fixed length which is obtained as an output of a hash function when arbitrary data are input to the hash function. A hash function is one example of a one-way function. A 'one-way function' is a function in a form of 'y=f(x)' where y is calculated quickly when x is given but where it is practically impossible to calculate x when y is given, since the function has no inverse function, and it would therefore take an inordinate amount of time to calculate x.

CP server device 12 has a function for generating and updating files containing the above-mentioned data in accordance with instructions of the CP. Hard disk device 12A also stores certificate data, which is issued by a CA, and certificates that the CP is authenticated by the CA. CP server device 12 further stores a program for calculating hash values of JAR files and certificate data following Secure Hash Algorithm 1 (referred to as 'SHA-1' hereinafter).

(1-2: Gateway Server Device)

Gateway server device 17 is managed by the above-mentioned carrier, and has hardware components and features of a general WWW server device, which device interconnects communication networks. Gateway server device 17 relays data between mobile packet communication network 15 and Internet 11.

(1-3: Trusted Server Device)

Trusted server device 18 is managed by the above-mentioned carrier, and has hardware components and features of a general WWW server device. Trusted server device 18 comprises hard disk device 18A, and after establishing a TCP connection with a communication device, when trusted server device 18 receives a request message following a GET method of HTTP using the TCP connection, trusted server device 18 reads out a file identified by a URL which is assigned to the GET method from hard disk device 18A, transmits a response message of HTTP containing the file to the communication device, and disconnects the TCP connection.

Hard disk device 18A stores SDFs each of which corresponds to each of trusted Java-APPs.

Figure 3:
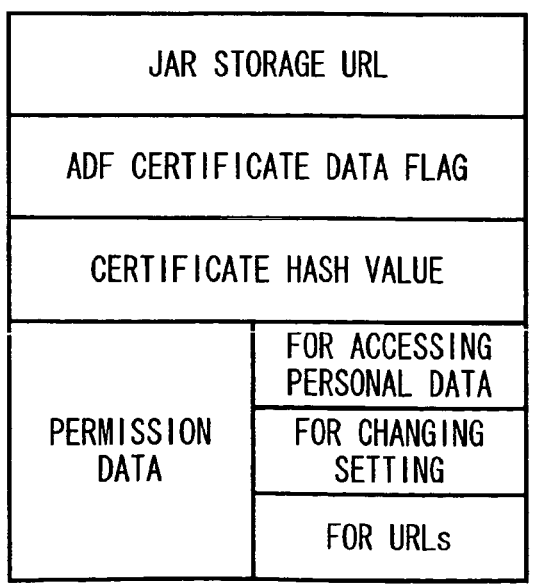
FIG. 3 is a conceptual drawing illustrating a data structure of a SDF stored in a trusted server device of the system.

A SDF is a file made by the carrier for a trusted Java-APP. As shown in FIG. 3, a SDF contains: a JAR storage URL which indicates a URL of a storage location of a JAR file containing the trusted Java-AP; an ADF certificate data flag which indicates whether a corresponding ADF contains certificate data; a certificate hash value which indicates a hash value calculated in accordance with the certificate data contained in the ADF; and permission data which indicates Application Program Interfaces (referred to as 'APIs' hereinafter) or URLs which a trusted Java-AP realized by the trusted Java-APP is permitted to use or access.

Permission data includes 'permission data for accessing personal data' which indicates whether it is permitted for the trusted Java-AP to use APIs for accessing telephone directory data, unread email data and outgoing/incoming email history data, 'permission data for changing setting' which indicates whether it is permitted for the trusted Java-AP to use APIs for changing settings of a melody or an image for notifying email arrivals/transmissions, and an image for a non-prompting screen, and 'permission data for URLs' which indicates URLs which the Java-AP is permitted to access.

(1-4: Mobile Station)

Figure 4:
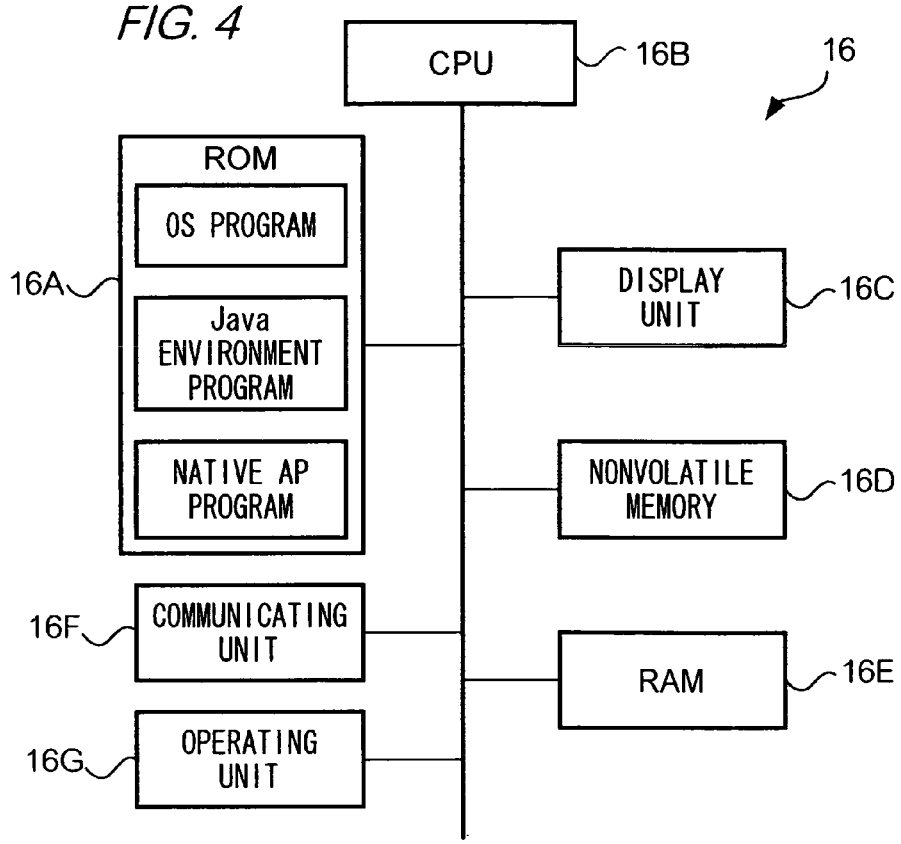
FIG. 4 is a block diagram illustrating configurations of a mobile station contained in the system.

As shown in FIG. 4, Mobile station 16 comprises: an Operating System (OS) program; a Java-AP environment program for establishing an environment for making Java-APs operable; ROM 16A for storing various kinds of programs such as native application programs; CPU 16B for running programs stored in ROM 16A; display unit 16C; nonvolatile memory 16D; RAM 16E; communicating unit 16F; and operating unit 16G. These components of mobile station 16 are connected to one another by way of a data bus.

Display unit 16C comprises, for example, a liquid crystal display panel and a panel driver circuit, and displays images constructed from data which are provided by CPU 16B.

Nonvolatile memory 16D is, for example, a Static Random Access Memory (SRAM) or an Electrically Erasable and Programmable Read Only Memory (EEPROM). Java-AP software which is downloaded from server devices contained in the WWW is stored in nonvolatile memory 16D. Nonvolatile memory 16D also stores a program for calculating hash values following SHA-1.

Communicating unit 16F comprises an antenna and a wireless communication unit; wirelessly communicates data packets with mobile packet communication network 15, and relays data packets between CPU 16B and mobile packet communication network 15. Communicating unit 16F comprises a CODEC, a microphone and a speaker for voice communication; and enables mobile station 16 to conduct voice communication through a mobile telephone network (not shown) which has a line switching system.

Operating unit 16G comprises hardware such as keypad for a user to input operations; and provides CPU 16B with certain signals in accordance with operations carried out by the user.

(2. Operation)

In the following description, example operations of the above-mentioned delivery system are explained.

Figure 5:
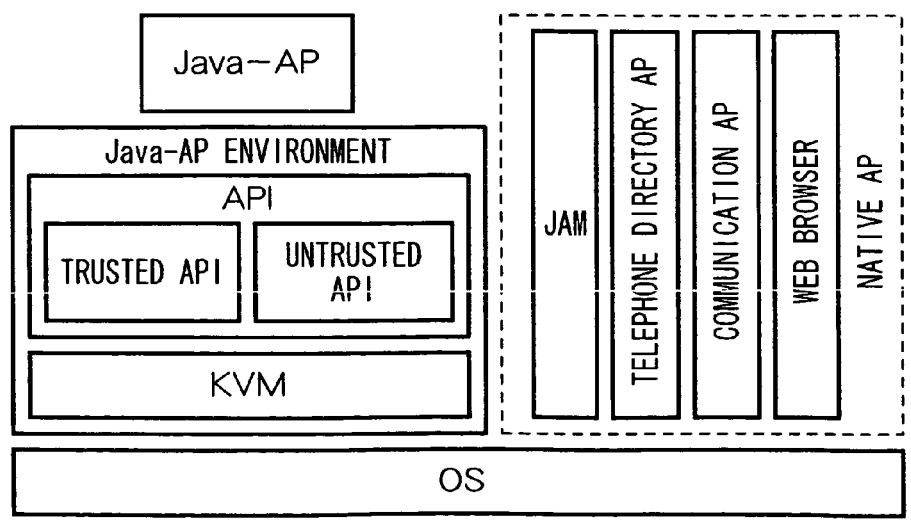
FIG. 5 is a conceptual drawing illustrating a functional structure of the mobile station.

When a power supply (not shown) of mobile station 16 is turned on, CPU 16B reads the OS program stored in ROM 16A and run the OS program using RAM 16E as a work area. Following instructions of the OS program, CPU 16B is capable of providing several basic functions such as controlling User Interface (UI). FIG. 5 shows a structure of an OS which is realized in mobile station 16 by the OS program. The OS specifies instructions provided by the user on the basis of signals received from operating unit 16G in accordance with operations of the user, and carries out certain processes in accordance with the instructions.

For example, when the user requests download of Java-AP software, a Web browser in the OS transfers the request to a Java Application Manager (referred to as a 'JAM' hereinafter).

When the user requests running of a JAM program, which is a native application program of mobile station 16, the OS starts the JAM program and realizes a JAM in mobile station 16. The JAM displays a list of Java-APPs installed to mobile station 16, and when the user selects one of the listed Java-APPs, the JAM starts the selected Java-APP. More concretely, when mobile station 16 receives from the user an instruction to start a certain Java-APP, the Java-AP environment program is started by CPU 16B, and a Java-AP environment is established in mobile station 16. Then, the Java-APP is started by CPU 16B using the Java-AP environment, and functions of a Java-AP are provided. A Java-AP environment contains, for example, K Virtual Machine (KVM) which is a lightweight Java virtual machine tuned to a mobile station such as mobile station 16, and APIs which provide several functions for Java-APs. APIs which are prepared for Java-APs are categorized into trusted APIs which only trusted Java-APs are permitted to use following permission data contained in SDFs, and untrusted Java-APIs which all Java-APs are permitted to use.

Explanations of operations for establishing and disconnecting TCP connections are omitted in this specification, since the operations follow a well-known method of HTTP. In the following explanation, operations which are executed by CPU 16B following instructions of the above-mentioned programs, such as the OS program, a Web browser program, a JAM program, a Java-APP and a native application program, are described as 'operations carried out by mobile station 16' to simplify the description.

(2-1: Preparation of Trusted Java-AP Software)

Figure 6:
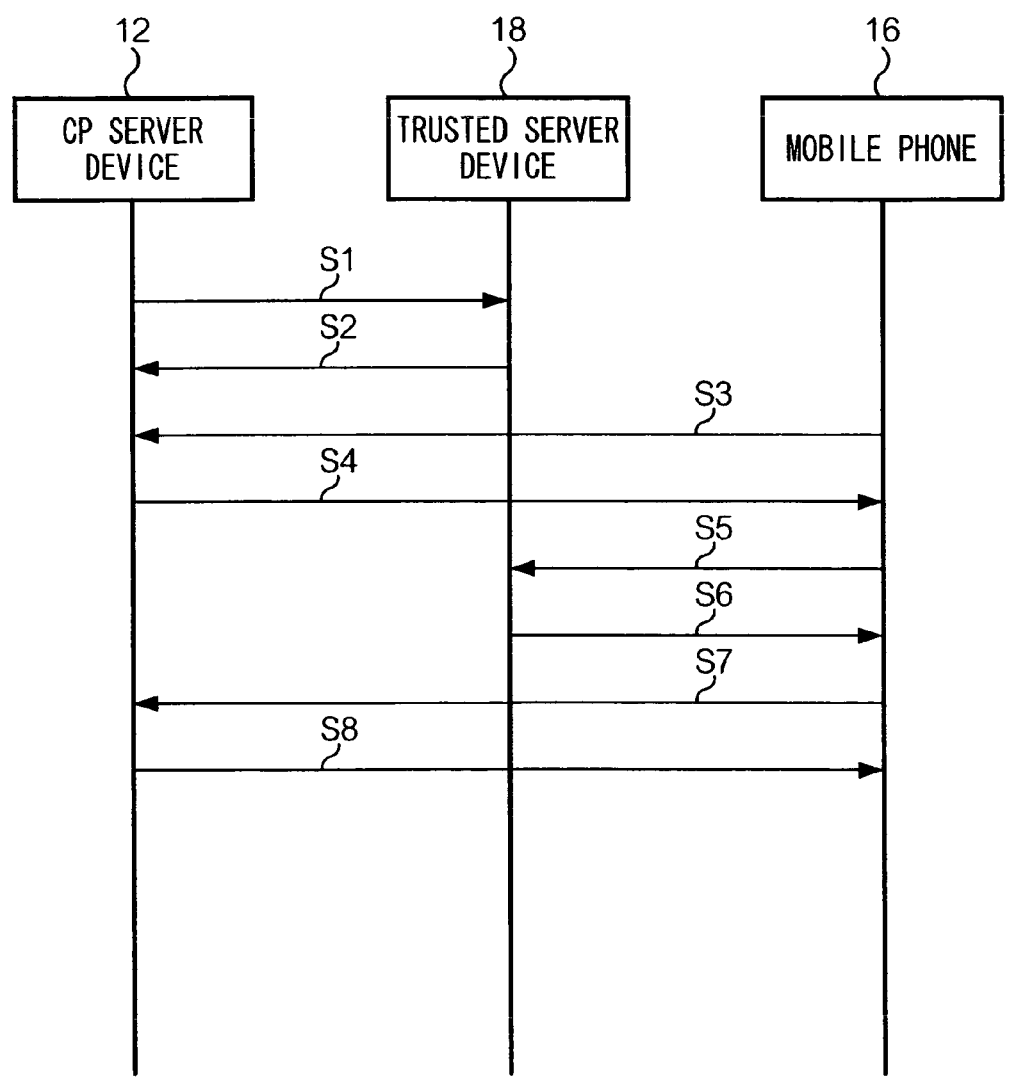
FIG. 6 is a sequence chart illustrating data flows in the embodiment of the present invention.

In the following, operations for CP server device 12, which is managed by a CP, to prepare a trusted Java-APP are explained with reference to FIG. 6.

The carrier provides to the CP in advance a program for calculating hash values of JAR files and certificate data following SHA-1. The program is referred to as a 'tool' hereinafter. Hard disk device 12A of CP server device 12 stores the tool as well as the certificate data received from the CA.

The CP prepares a Java-APP for realizing a Java-AP which is capable of changing melodies for notifying email arrivals in accordance with telephone numbers of senders of emails. The Java-APP is named 'Melody by Telno Appli'. The CP instructs CP server device 12 to generate a JAR file containing a 'Melody by Telno Appli', and to store the JAR file in a storage location identified by a storage URL of 'http://www-.b.co.jp/melodyjar'. On the other hand, the CP inputs data to be contained in an ADF, such as data indicating the name of the Java-APP 'Melody by Telno Appli' and the JAR storage URL, to CP server device 12. Then, the CP instructs CP server device 12 to run the tool.

Following the instruction of the CP, the CPU of CP server device 12 reads the tool stored in hard disk device 12A, and following instructions of the tool, calculates a hash value of the JAR file (referred to as a 'JAR hash value' hereinafter) and a hash value of the certificate data (referred to as a 'certificate hash value' hereinafter). Then, the CPU of CP server device 12 generates an ADF which contains data indicating the JAR hash value, the certificate data, the data indicating the name of Java-APP 'Melody by Telno Appli', and the data indicating the JAR storage URL 'http://www.b.co.jp/melody.jar'.

Then, CP server device 12 transmits, to trusted server device 18, the ADF and the JAR file along with data indicating the certificate hash value (step S1).

When the carrier, which manages trusted server device 18, receives the above-mentioned files and data from CP server device 12, the carrier determines whether the CP is authorized.

More concretely, the carrier checks whether the certificate data contained in the ADF is issued by a CA which the carrier relies on, or whether the certificate data is issued by plural CAs with a valid certificate chain and the plural CAs are managed by a CA of a higher level which the carrier rely on.

After completing the authenticity check, the carrier determines authenticity of the Java-APP provided by the CP. More concretely, the carrier inspects descriptions of the Java-APP contained in the JAR file to check whether the Java-AP realized by the Java-APP does not destroy personal data stored in mobile station 16, not leak the personal data to an external device, and so on.

After the inspection of the program, the carrier determines APIs which the Java-AP is permitted to use and URLs which the Java-AP is permitted to access, in accordance with a result of the inspection. The carrier then inputs data indicating the APIs and URLs to trusted server device 18.

In response to the input, the CPU of trusted server device 18 generates a SDF which corresponds to the ADF and the JAR file received from CP server device 12. The SDF generated by the CPU contains data indicating the JAR storage URL 'http://www.b.co.jp/melodyjar' contained in the ADF, an ADF certificate data flag 'YES', data indicating the certificate hash value received from CP server device 12, and permission data indicating the APIs and the URLs input by the carrier.

After generating the ADF, the CPU of trusted server device 18 adds data indicating a trusted APID '0001', which identifies the trusted Java-APP, and data indicating a trusted server domain 'http://www.a.co.jp/melody.sdf', which identifies a storage location of the SDF in trusted server device 18. Then, the CPU transmits the ADF containing the above-mentioned data to CP server device 12 (step S2).

The CPU of CP server device 12 receives the ADF and stores the ADF in hard disk device 12A. After the storage of the ADF in CP server device 12, the JAR file containing the Java-APP becomes ready to be downloaded to mobile station 16.

(2-2: Download of Java-AP Software to Mobile Station 16)

In the following, operations which are executed in the delivery system when the user instructs mobile station 16 to download Java-AP software, will be explained with reference to FIG. 6.

In the following explanation, it is supposed that the ADF and the JAR file of the Java-AP software to be downloaded are not modified after the Java-AP software is prepared, as explained in section 2-1.

The user instructs mobile station 16 to download the trusted Java-APP 'Melody by Telno Appli' from CP server device 12 to mobile station 16 by using operating unit 16G.

When CPU 16B receives the instruction made by the user for downloading the trusted Java-AP software through the Web browser, CPU 16B carries out a series of processes for downloading the trusted Java-APP to mobile station 16 as follows.

First, CPU 16B receives the ADF corresponding to the Java-APP from CP server device 12. More concretely, CPU 16B establishes a TCP connection with CP server device 12, generates a request message for transmitting the ADF, and transmits the request message to CP server device 12 (step S3). CPU 16B receives a response message containing the ADF in response to the request message (step S4), and disconnects the TCP connection. After receiving the response message, CPU 16B stores the ADF contained in the response message in nonvolatile memory 16D.

Then, CPU 16B determines whether the Java-APP to be downloaded is a trusted Java-APP. More concretely, CPU 16B checks whether the ADF contains data indicating a trusted APID, and when the ADF contains the data, CPU 16B determines that the Java-APP is a trusted Java-APP since the data indicates that there is a SDF corresponding to the Java-APP. On the other hand, when the ADF does not contain the data, CPU 16B determines that the Java-APP is an untrusted Java-APP.

In a case that the Java-APP to be downloaded is an untrusted Java-APP, mobile station 16 downloads the JAR file from a storage location, which is identified by the data indicating the JAR storage URL contained in the ADF, following the same procedures as carried out in a normal delivery system in the prior art.

In this example case, since the ADF contains data indicating the trusted APID '0001', CPU 16B determines that the Java-APP to be downloaded is a trusted Java-APP. Accordingly, CPU 16B receives the SDF which corresponds to the Java-APP from a storage location identified by the data indicating the trusted server domain 'http://www.a.co.jp/melody.sdf'. More concretely, CPU 16B establishes a TCP connection with trusted server device 18, generates a request message for transmitting the SDF, which is identified by the trusted server domain 'http://www.a.co.jp/melody.sdf' indicated by the data contained in the ADF, and transmits the request message using the TCP connection (step S5). CPU 16B receives a response message containing the SDF in response to the request message (step S6), and disconnects the TCP connection.

Figure 7:
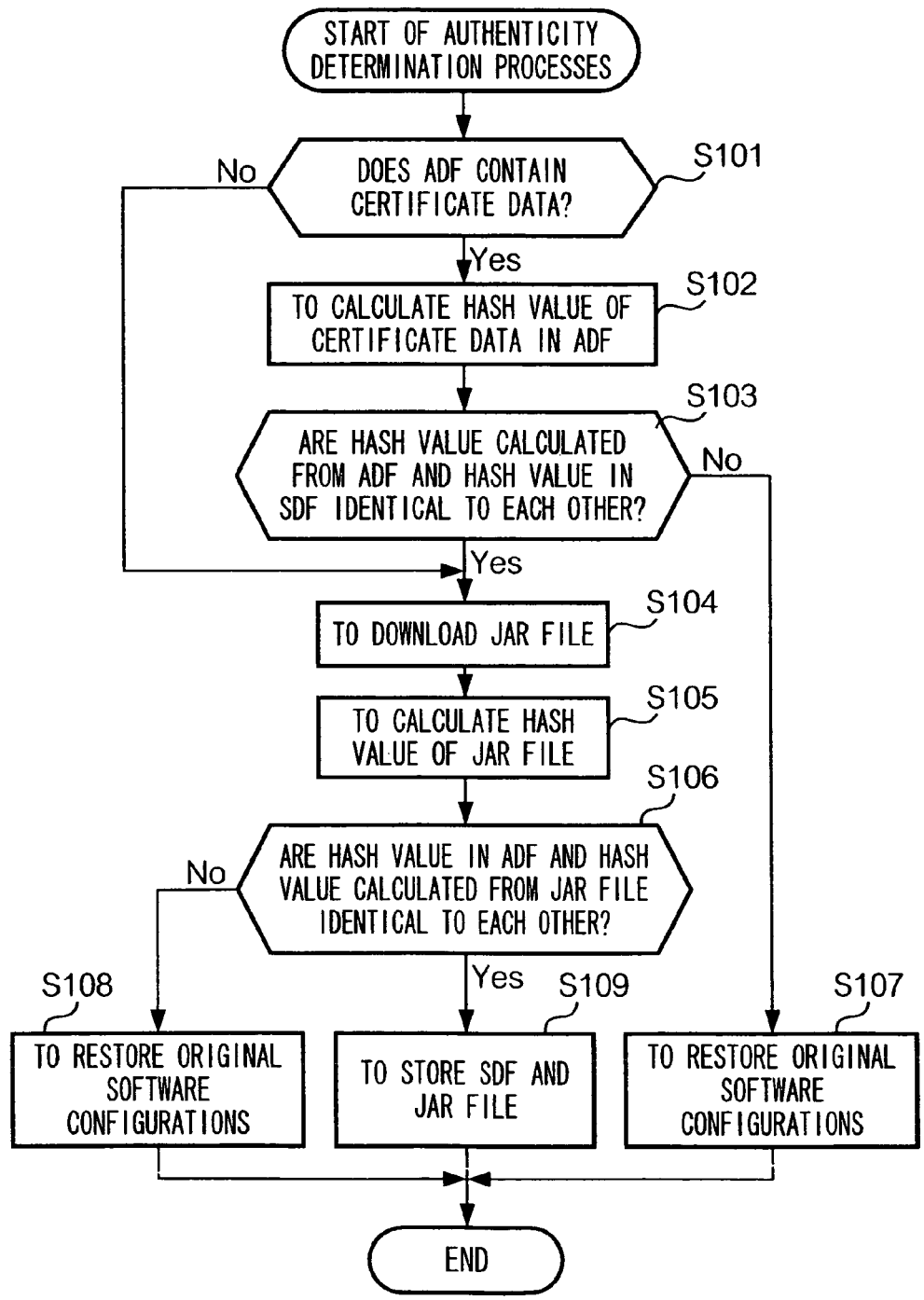
FIG. 7 is a flowchart illustrating processes for determining authenticity of downloaded files executed in the mobile station.

In the following, operations for determining authenticity of the trusted Java-AP software after downloading the trusted Java-AP software are explained with reference to FIG. 7.

CPU 16B determines whether the ADF contains certificate data (step S101). More concretely, CPU 16B checks whether the ADF contains ADF certificate data flag indicating 'YES'. When CPU 16B determines that the ADF does not contain certificate data (step S101; No), CPU 16B skips the processes for inspecting certificate data, and moves to processes for downloading the JAR file (step S104).

In this example case, since the ADF contains the ADF certificate flag data indicating 'YES', CPU 16B determines that the ADF contains certificate data (step S101; Yes), and calculates a hash value of the certificate data contained in the ADF (step S102).

After calculating the hash value, CPU 16B compares the calculated hash value and the hash value contained in the SDF to determine whether they are identical to each other (step S103). If the hash values are not identical to each other (step S103; No), a possibility exists that the certificate data contained in the ADF has been modified by somebody after the carrier prepared the SDF. Therefore, CPU 16B notifies a download failure to the user, deletes the ADF, restores software configurations in mobile station 16 in a state before the ADF was downloaded (step S1107), and terminates the processes for downloading the Java-AP software.

In this example case, the hash values are determined to be identical to each other (step S103; Yes), and CPU 16B downloads the JAR file to mobile station 16 (step S104). More concretely, CPU 16B establishes a TCP connection with CP server device 12 using the JAR storage URL 'http://www.b-.co.jp/melody.jar', which is contained in the ADF, and indicates a storage location in CP server device 12 where the JAR file is stored, generates a request message for transmitting the JAR file, and transmits the request message to CP server device 12 (step S7 in FIG. 6). CPU 16B receives a response message containing the JAR file from CP server device 12 in response to the request message (step S8 in FIG. 6), and disconnects the TCP connection.

After receiving the response message, CPU 16B calculates a hash value of the JAR file contained in the response message (step S1105). CPU 16B compares the calculated hash value and the JAR hash value contained in the ADF to determine whether they are identical to each other (step S106). When the hash values are not identical to each other (step S106; No), a possibility exists that the JAR file has been falsified or modified after the JAR file was prepared. Therefore, CPU 16B notifies a download failure to the user, deletes the ADF and the JAR file, restores software configurations in mobile station 16 to a state before the ADF was downloaded (step S108), and terminates the processes for downloading the Java-AP software.

In this example case, the hash values are identical to each other (step S106; Yes). Accordingly, CPU 16B notifies to the user that the Java-AP software was downloaded successfully, stores the received JAR file and the received SDF in nonvolatile memory 16D (step S109), and completes the processes for downloading the Java-AP software.

After completing the downloading processes for the trusted Java-AP software, CPU 16B monitors behavior of a trusted Java-AP realized by the trusted Java-APP contained in the JAR file, and permits or restricts use by the Java-AP of APIs for accessing personal data such as the telephone directory data and for changing settings of mobile station 16, and access to URLs, in accordance with the permission data for accessing personal data, the permission data for changing setting, and the permission data for URLs respectively, which are contained in the SDF.

As explained above, according to the present embodiment, it is possible to determine whether certificate data which is contained in an ADF has been modified or after the carrier has determined authenticity of the certificate data, by verifying that a hash value, which is calculated using the certificate data contained in the ADF, and a hash value calculated in advance using the certificate data and contained in a corresponding SDF, are identical to each other. In short, according to the present embodiment, authenticity of a combination of a SDF and an ADF is determined.

When the certificate data in the ADF is overwritten with the same certificate data as contained in the SDF, hash values of both of the certificate data become identical, and the combination of the SDF and the ADF is determined as authenticated, even when the ADF is modified after the SDF was prepared. Accordingly, if the CP needs to modify the ADF to modify the JAR file for the purpose of, for example, fixing bugs in the JAR file, after the carrier determines authenticity of the certificate data the CP is able to maintain authenticity of the combination between the SDF and the ADF on the basis of the same certificate data in the modified ADF as is used in the original ADF. Therefore, the carrier does not have to repeat operations for determining authenticity of the certificate data when the ADF is modified by the CP.

Moreover, according to the present embodiment, it is possible to determine whether a JAR file which is downloaded from a CP has been modified or falsified after the carrier determines authenticity of the JAR file, by verifying that a hash value which is calculated using the downloaded JAR file and a hash value which was calculated in advance using the JAR file and contained in a corresponding ADF are identical to each other. In short, according to the present embodiment, authenticity of a combination of a JAR file and an ADF is determined. Accordingly, use of a falsified JAR file in mobile station 16 can be prevented.

Moreover, according to the present embodiment, there is no need to distribute to each mobile station in advance a recording medium such as an IC card which contains a hash value.

Accordingly, in the delivery system according to the present embodiment, authenticity of combinations of ADFs, SDFs and JAR files can be readily determined.

Since processes for calculating a hash value require far less computing resources than those for calculating a public key used in conventional authentication systems, the present embodiment can be adopted for use with a device whose computing resources are limited, such as a mobile station.

(3: Modification)

The present invention is not limited to the embodiment described above, and may be modified within the technical scope of the present invention. Following are examples of such modifications.

(1) In the embodiment above, a SDF contains a hash value of certificate data, which is contained in an ADF which corresponds to the SDF, and mobile station 16 determines authenticity of a combination of the SDF and the ADF by comparing a hash value calculated by use of the certificate data contained in the ADF, and the hash value contained in the SDF. A hash value used in the delivery system is not limited to a hash value of certificate data, and a hash value of another type of data contained in an ADF, or a hash value of the whole ADF can also be used for the same purpose.

Moreover, in the embodiment above, an ADF contains a hash value of a corresponding JAR file, and mobile station 16 determines authenticity of a combination of the ADF and the JAR file by comparing a hash value calculated by use of the JAR file and the hash value contained in the ADF. A hash value used in the delivery system is not limited to a hash value of the whole of JAR file, and a hash value of a part of the JAR file can also be used for the same purpose.

(2) In the embodiment above, hash functions using SHA-1 are used for calculating hash values for determining authenticity of combinations of files. However, other sorts of hash functions can also be used in the delivery system. For example, hash functions using Message Digest 5 (MD5) are also adopted to the delivery system according to the present invention. Moreover, all other sorts of one-way functions can be used in the delivery system, instead of the hash functions.

(3) In the embodiment above, programs for determining authenticity of files are stored in a ROM of a mobile station. The programs may be stored any other sorts of storage devices such as an EEPROM of a mobile station. When the programs are stored in a re-writable storage device such as an EEPROM, the programs can be downloaded to the mobile station from an external device through the mobile communication network, and stored in the re-writable storage device. When the mobile station has an interface for communicating with an external storage device, the programs can be provided to the mobile station by connecting to the mobile station an external storage device such as a memory card containing the programs. In this case, the mobile station may read out the program directly from the external storage device and execute them.

(4) In the above-explained embodiment, an ADF contains data indicating a trusted server domain, and a SDF, which corresponds to a trusted Java-APP to be downloaded to a mobile station, is identified on the basis of the data. A SDF may be identified in other ways. For example, mobile station 16 may obtain data indicating a URL for identifying trusted server device 18 in advance, and when mobile station 16 generates a request message for transmitting the SDF from trusted server device 18 to mobile station 16, mobile station 16 may add to the request message the URL identifying trusted server device 18 and data indicating a trusted APID for identifying the SDF corresponding to trusted Java-AP software to be downloaded.

The invention claimed is:

1. A communication device for verifying whether application data is valid in order to determine whether to execute the application data on the communication device, the verification of the application data using a first file, a second file, and a third file, the first file comprising the application data, the second file comprising application validity data used to verify validity of the application data in the first file and containing data indicating a location where a program, which is contained in the first file and run in the communication device, is stored, the first file, second file, and the third file being separate from one another, the third file comprising second file validity data calculated with a one-way function and used to verify the second file, the communication device comprising:
    a receiver for receiving the first file, second file, and third file;
    at least one processor for:
        generating a second file calculated value using the one-way function, at least a part of the second file being input to the one-way function to generate the second file calculated value;
        comparing the second file calculated value with the second file validity data in the third file; and
        determining whether the second file is valid based on the comparing of the second file calculated value with the second file validity data in the third file; and
        executing the application data on the communication device if the application data is verified using the application validity data in the second file and if it is determined that the second file is valid.

2. The communication device of claim 1, wherein, if it is determined that the second file is valid, the processor further verifies whether the application data in the first file is valid using the application validity data in the second file.

3. The communication device of claim 2, where the application validity data is calculated on the basis of a one-way application validity function, the one-way application validity function using at least a part of the application data in the first file to generate the application validity data.

4. The communication device of claim 3, where the one-way application validity function comprises a hash function;
    where the application validity data comprises a hash value;
    where at least a part of the first file is input to the hash function to generate a calculated hash value; and
    where using the application validity data in the second file to verify the validity of the application data in the first file comprises comparing the calculated hash value with the hash value in the second file.

5. The communication device of claim 4, where the one-way application validity function and the one-way function each comprise the same hash function.

6. The communication device of claim 1, where the application data comprises an application program.

7. The communication device of claim 1, where at least a part of the second file comprises independent data, the independent data being independent of the application data contained in the first file; and
    where generating a second file calculated value using the one-way function comprises inputting the independent data to the one-way function to generate the second file calculated value.

8. The communication device of claim 7, where the independent data comprises certificate data for certifying authenticity of the application data, the certificate data being provided by a certificate authority.

9. The communication device of claim 8, where the third file is received from a trusted server;
    where the second file is received from a content provider server, the content provider server being different from the trusted server; and
    where the third file is used to verify the certificate data in the second file.

10. The communication device of claim 1, where the one-way function comprises a hash function;
    where the second file validity data comprises a hash value;
    where at least a part of the second file is input to the hash function to generate a calculated hash value; and
    where comparing the second file calculated value with the second file validity data in the third file comprises comparing the calculated hash value with the hash value in the third file.

11. The communication device of claim 1, where the receiver receives the second and third files prior to receiving the first file; and
    where the receiver receives the first file only after the at least one processor determines whether the second file is valid.

12. A method for a communication device to verify whether application data is valid in order to determine whether to execute the application data on the communication device, the verification of the application data using a first file, a second file, and a third file, the first file comprising the application data, the second file comprising application validity data used to verify validity of the application data in the first file and containing data indicating a location where a program, which is contained in the first file and run in the communication device, is stored, the first file, the second file, and the third file being separate from one another, the third file comprising second file validity data calculated with a one-way function and used to verify the second file, the method comprising:

receiving the first file, the second file and the third file at the communication device;

generating a second file calculated value using the one-way function, at least a part of the second file being input to the one-way function to generate the second file calculated value;

comparing the second file calculated value with the second file validity data in the third file;

determining whether the second file is valid based on the comparing of the second file calculated value with the second file validity data in the third file; and executing the application data on the communication device if the application data is verified using the application validity data in the second file and if it is determined that the second file is valid.

13. The method of claim 12, further comprising, if it is determined that the second file is valid, verifying whether the application data in the first file is valid using the application validity data in the second file.

14. The method of claim 13, where the application validity data is calculated on the basis of a one-way application validity function, the one-way application validity function using at least a part of the application data in the first file to generate the application validity data.

15. The method of claim 14, where the one-way application validity function comprises a hash function;

where the application validity data comprises a hash value;

where at least a part of the first file is input to the hash function to generate a calculated hash value; and where using the application validity data in the second file to verify the validity of the application data in the first file comprises comparing the calculated hash value with the hash value in the second file.

16. The method of claim 15, where the one-way application validity function and the one-way function each comprise the same hash function.

17. The method of claim 12, where the application data comprises an application program.

18. The method of claim 12, where at least a part of the second file comprises independent data, the independent data being independent of the application data contained in the first file; and where generating a second file calculated value using the one-way function comprises inputting the independent data to the one-way function to generate the second file calculated value.

19. The method of claim 18, where the independent data comprises certificate data for certifying authenticity of the application data, the certificate data being provided by a certificate authority.

20. The method of claim 19, where the third file is received from a trusted server;

where the second file is received from a content provider server, the content provider server being different from the trusted server; and where the third file is used to verify the certificate data in the second file.

21. The method of claim 12, where the one-way function comprises a hash function;

where the second file validity data comprises a hash value;

where at least a part of the second file is input to the hash function to generate a calculated hash value; and where comparing the second file calculated value with the second file validity data in the third file comprises comparing the calculated hash value with the hash value in the third file.

22. The method of claim 12, where the second and third files are received prior to receiving the first file; and where the first file is received only after determining whether the second file is valid.

* * * * *